US011623425B2

(12) United States Patent
Visscher et al.

(10) Patent No.: US 11,623,425 B2
(45) Date of Patent: Apr. 11, 2023

(54) CARRIER MATERIAL FOR VINYL FLOOR COVERING

(71) Applicants: LOW & BONAR B.V., Arnhem (NL); SAINT-GOBAIN ADFORS, Chambery (FR)

(72) Inventors: Edze Jan Visscher, Utrecht (NL); Ype Zijpp Van Der, Wijhe (NL); Hans Veltman, Rozendaal (NL); Pepijn Kuik, Eerbeek (NL); Leonie Stigter, Driebergen (NL); Sophie Lelogeay, Ontex (FR); Eric Daniel, Miranda de Ebro (ES); Mantecon Torres Alejandro Javier, Miranda de Ebro (ES)

(73) Assignees: LOW & BONAR B.V., Arnhem (NL); SAINT-GOBAIN ADFORS, Chambery (FR)

( * ) Notice: Subject to any disclaimer, the term of this patent is extended or adjusted under 35 U.S.C. 154(b) by 293 days.

(21) Appl. No.: 15/307,334

(22) PCT Filed: Apr. 28, 2015

(86) PCT No.: PCT/EP2015/059167
§ 371 (c)(1),
(2) Date: Oct. 27, 2016

(87) PCT Pub. No.: WO2015/165886
PCT Pub. Date: Nov. 5, 2015

(65) Prior Publication Data
US 2017/0043551 A1    Feb. 16, 2017

(30) Foreign Application Priority Data
Apr. 29, 2014  (EP) .................................. 14166373

(51) Int. Cl.
B32B 5/02        (2006.01)
B32B 5/26        (2006.01)
(Continued)

(52) U.S. Cl.
CPC .............. B32B 5/022 (2013.01); B32B 5/028 (2013.01); B32B 5/26 (2013.01); D04H 3/14 (2013.01);
(Continued)

(58) Field of Classification Search
CPC ............. D06N 2205/026; D06N 7/006; D06N 7/0049; D06N 2201/082; D06N 2211/08;
(Continued)

(56) References Cited

U.S. PATENT DOCUMENTS 3,968,290 A    7/1976  Dees, Jr. et al.
4,491,617 A    1/1985  O'Connor et al.
(Continued)

FOREIGN PATENT DOCUMENTS

EP    0806509 A1    11/1997
EP    1939342 A2    7/2008
(Continued)

OTHER PUBLICATIONS

Mallick, P.K.. (2008). Fiber-Reinforced Composites—Materials, Manufacturing, and Design (3rd Edition). Taylor & Francis.*
(Continued)

Primary Examiner — Jennifer A Gillett
(74) Attorney, Agent, or Firm — Oliff PLC

(57) ABSTRACT

A carrier material for vinyl floor covering, wherein the carrier material includes a nonwoven layer containing at least 50 wt. % of thermoplastic fibers and a scrim for eliminating wrinkles in the vinyl floor covering. The scrim includes weft yarns having a linear density of 28 tex or less.
(Continued)

The carrier material prevents the formation of surface irregularities and printing errors in the vinyl floor covering.

11 Claims, 1 Drawing Sheet

(51) Int. Cl.
| | | |
|---|---|---|
| D06N 3/06 | (2006.01) | |
| D06N 7/00 | (2006.01) | |
| D04H 3/14 | (2012.01) | |
| D04H 5/06 | (2006.01) | |
| D04H 3/16 | (2006.01) | |
| D04H 5/12 | (2012.01) | |
| D04H 3/147 | (2012.01) | |

(52) U.S. Cl.
CPC ............... *D04H 3/147* (2013.01); *D04H 3/16* (2013.01); *D04H 5/06* (2013.01); *D04H 5/12* (2013.01); *D06N 3/06* (2013.01); *D06N 7/006* (2013.01); *B32B 2262/0276* (2013.01); *B32B 2262/101* (2013.01); *B32B 2419/06* (2013.01); *B32B 2471/00* (2013.01); *D06N 2201/02* (2013.01); *D06N 2201/082* (2013.01)

(58) Field of Classification Search
CPC .... D06N 3/0022; D06N 3/0036; B32B 5/002; B32B 5/06; B32B 5/08; B32B 2307/736; B32B 27/304; D10B 2101/06; D10B 2331/021; D10B 2503/04; E04F 15/186
USPC ....... 442/2, 11, 13, 20, 26, 35, 59, 268, 280, 442/281
See application file for complete search history.

(56) References Cited

U.S. PATENT DOCUMENTS

| | | | | |
|---|---|---|---|---|
| 4,539,254 | A | | 9/1985 | O'Connor et al. |
| 5,293,676 | A | * | 3/1994 | Geirhos ................ D02G 1/165 123/243 |
| 5,792,713 | A | * | 8/1998 | Scari .................... H05K 1/0366 139/11 |
| 6,296,921 | B1 | * | 10/2001 | Blackmore ............... B32B 5/26 428/102 |
| 2001/0018106 | A1 | * | 8/2001 | Gautreau ............... D04H 3/002 428/50 |
| 2006/0035547 | A1 | * | 2/2006 | Gautreau ............. B29C 70/202 442/58 |
| 2007/0281562 | A1 | * | 12/2007 | Kohlman ................. B32B 5/04 442/32 |
| 2008/0176022 | A1 | * | 7/2008 | Payne .................... D04H 11/00 428/91 |
| 2008/0193697 | A1 | | 8/2008 | Hinault et al. |
| 2010/0291827 | A1 | * | 11/2010 | Weiter ................... D04H 1/435 442/327 |
| 2011/0223402 | A1 | * | 9/2011 | Gamert .................... C08L 3/02 428/219 |

FOREIGN PATENT DOCUMENTS

| | | |
|---|---|---|
| EP | 2360304 A1 | 8/2011 |
| FR | 2013722 A1 | 4/1970 |
| WO | 01/09421 A2 | 2/2001 |
| WO | 0108879 A2 | 2/2001 |
| WO | 2005/118947 A1 | 12/2005 |
| WO | 2009/079254 A1 | 6/2009 |

OTHER PUBLICATIONS

Complete Textile Glossary, Celanese Acetate LLC, 2001.*
Sep. 21, 2015 International Search Report issued in International Patent Application No. PCT/EP2015/059167.
Jan. 17, 2019 Opposition against the European Patent.

* cited by examiner

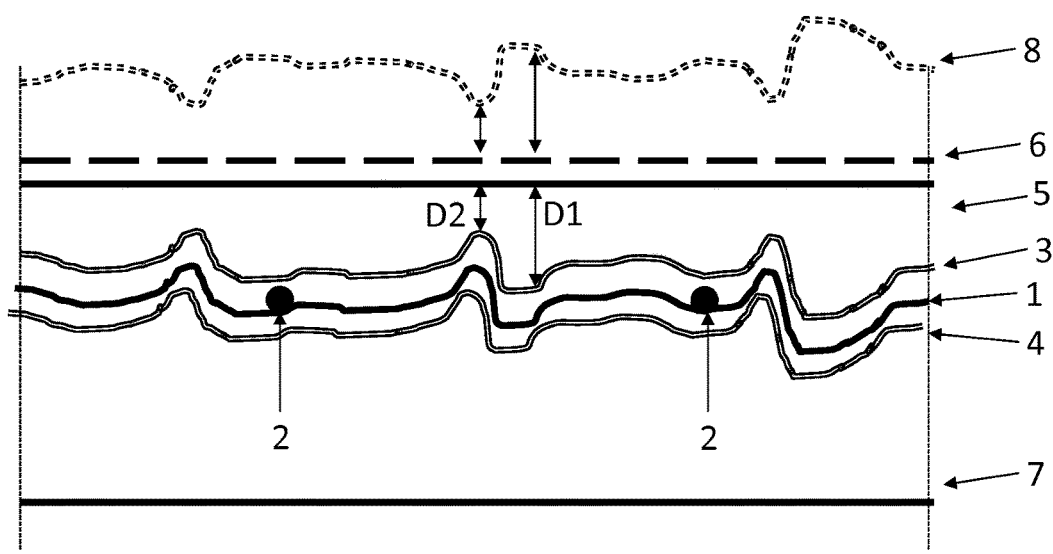

CARRIER MATERIAL FOR VINYL FLOOR COVERING

The invention pertains to carrier materials comprising a nonwoven layer comprising thermoplastic fibers and which are to be impregnated by a thermoplastic matrix such as for example bitumen or polyvinyl chloride (PVC), so as to make a final composite product such as a roofing, flooring, or carpeting composite product. The invention also pertains to composite products such as cushioned vinyl floor coverings or other flooring, roofing or carpeting composite products comprising said carrier material and a thermoplastic matrix impregnated into said carrier material.

As an example of such composite products, a cushioned vinyl floor covering is made by applying several PVC based layers on a carrier material, each layer of PVC having its own function.

The carrier material is impregnated with a layer of PVC plastisol, which is gelated at elevated temperature, generally in the range of 140° C. to 170° C., for example while the impregnated carrier material is in contact with the surface of a hot (metal) roller. Subsequently, a foaming layer of PVC plastisol comprising a blowing agent is coated on the gelated impregnation layer, which is subsequently also gelated at elevated temperature.

Desired ink patterns are applied onto the gelated foaming layer using printing units. On top of this printing layer a layer of clear, transparent PVC plastisol is applied as a wear layer, which again is gelated at elevated temperature. At the bottom side a backing layer of a foamable PVC plastisol comprising a relatively large amount of blowing agent is generally applied. The blowing agents in the PVC plastisol of the foaming layer and the backing layer are activated in a curing step at a temperature above the gelation temperatures, generally in the range of 170° C. to 230° C., to foam and to cure the PVC in the foaming layer and the PVC in the backing layer in order to obtain the cushioned vinyl floor covering.

Cushioned vinyl floor covering comprising a nonwoven carrier composed of thermoplastic fibers is known, for example from FR2013722 A1 and WO2005/118947 A1. Such a nonwoven carrier composed of thermoplastic fibers provides better tear resistance and flexibility to the cushioned vinyl floor covering as compared to non-thermoplastic fiber based carriers.

FR2013722 A1 discloses a nonwoven mat made from nylon (polyamide) filaments with a vinyl chloride coating usable as floor covering. The nonwoven mat is bonded by hydrogen bonds at the points of intersection of the filaments.

WO2005/118947 A1 discloses a nonwoven carrier wherein the nonwoven is made from different polymers and the nonwoven carrier is thermally bonded by a polymer originating from the filaments comprised in the nonwoven carrier.

WO 01/09421 A2 discloses a carrier for roofing felts, wall and floor coverings comprising a glass staple fiber nonwoven pre-consolidated with a binder and a nonwoven of synthetic fibers, which are bonded together by hydroentanglement. The carrier may comprise a reinforcement in the form of a scrim wherein the threads are about 20 to 150 tex.

However, it has been observed that cushioned vinyl floor coverings comprising a nonwoven carrier composed of thermoplastic fibers may exhibit wrinkles during processing in the cushioned vinyl floor covering manufacturing process, the wrinkles extending essentially in machine direction of the cushioned vinyl floor covering, due to shrinkage and/or contraction of the nonwoven carrier in cross machine direction, which results in low quality cushioned vinyl floor covering or even in rejected product, i.e. waste material, depending on the quantity and magnitude of the wrinkles.

It was found that a carrier for cushioned vinyl floor covering comprising a nonwoven layer of fibers comprising thermoplastic fibers and a scrim composed of commonly available glass yarns having a linear density of either 34 tex or 68 tex both as warp and weft yarns, reduces or even fully eliminates the formation of wrinkles extending in machine direction in the cushioned vinyl floor covering. The unit tex defines the fineness of the fibers as their weight in grams per 1000 meter length.

However, it has been observed that such a scrim composed of commonly available glass yarns of 34 tex or 68 tex may induce surface irregularities in the final cushioned vinyl floor covering and/or may cause printing errors in the desired ink patterns applied onto the gelated foaming layer. Although not being bound by theory, it is believed that the occurrence of surface irregularities and/or printing errors in the cushioned vinyl floor covering is caused by buckling of the weft yarns of the scrim, i.e. bending or kinking of the weft yarns, as a result of compressive stress, when the nonwoven layer of fibers shrinks or contracts in cross machine direction.

There remains a need for a carrier material comprising a nonwoven layer comprising thermoplastic fibers which eliminates, or at least reduces, the problems of the prior art carrier materials.

It is an object of the invention to provide a carrier material for cushioned vinyl floor covering comprising a nonwoven layer comprising thermoplastic fibers which prevents the formation of wrinkles in cushioned vinyl floor covering, and which prevents the occurrence of surface irregularities and/or printing errors in cushioned vinyl floor covering.

The object of the invention is achieved by the carrier material in accordance with claim 1.

Although yarns having a lower linear density are expected to be less stiff as compared to yarns having a higher linear density, and are thus expected to be less resistant to compressive stresses, it was surprisingly found that a carrier material comprising one or more nonwoven layer(s) of fibers, wherein each of the nonwoven layers of fibers is composed of thermoplastic fibers for at least 50 wt. % of the total weight of fibers in the respective nonwoven layer of fibers, and a scrim comprising glass weft yarns having a linear density of 28 tex or less, or high modulus polyester weft yarns having a linear density of 50 tex or less, prevents, or at least significantly reduces, the formation of printing errors and/or surface irregularities in the cushioned vinyl floor covering.

In an embodiment, the scrim comprises high modulus weft yarns, such as for example glass yarns or high modulus polyester yarns. All weft yarns in the scrim may be high modulus yarns. Preferably, the weft yarns are inorganic yarns, more preferably glass yarns having a linear density of 28 tex or less, more preferably 20 tex or less, even more preferably 15 tex or less. Alternatively, the weft yarns are organic yarns, more preferably high modulus polyester yarns, having a linear density of 50 tex or less, more preferably 40 tex or less, even more preferably 30 tex or less.

The high modulus weft yarns preferably have a modulus of at least 25 GPa, preferably at least 40 GPa, more preferably at least 50 GPa, most preferably at least 75 GPa.

The unit tex defines the fineness of the fibers, threads or yarns as their weight in grams per 1000 meter length. So as to be clear, a thread or "yarn" is made of an assembly of a multitude of filaments or fibers, the filaments or fibers individually having a much lower tex than the yarn.

By definition, as is well known to the person skilled in the art, weft yarns extend in cross machine direction, while warp yarns extend in machine direction.

In one embodiment, the one (or more) nonwoven layer of fibers and the scrim of the carrier material may be supplied in the final composite product, such as a cushioned vinyl floor covering, manufacturing process as two (or more) separate layers, i.e. not connected to each other, preferably oriented plane parallel to each other, more preferably directly adjacent to each other, i.e. in direct contact with each other, as long as the tensions in the composite product manufacturing process are applied to all the layers of the carrier material simultaneously.

The carrier material may comprise one or more further material layers, each further material layer comprising a nonwoven layer of fibers, wherein the nonwoven layer of fibers comprises thermoplastic fibers for at least 50 wt. % of the total weight of fibers in the nonwoven layer of fibers, or a scrim, for example to improve the mass uniformity of the carrier material, to further reduce the shrinkage and/or contraction in cross machine direction of the nonwoven layer of fibers comprised in the carrier.

A general demand to carrier materials for composite products, such as cushioned vinyl floor coverings, is a sufficient surface regularity, i.e. a sufficiently even thickness over the surface of the carrier material, necessary to apply the impregnation layer regularly over the full width of the carrier material. Furthermore, sufficient structure openness is needed for even penetration of the thermoplastic matrix through the carrier material in order to have sufficient adhesion of the plastisol to the carrier material and to have sufficient delamination strength between the top layers and the foamed backing layer. On the other hand, the carrier material should exhibit a sufficiently dense surface, i.e. sufficient coverage by the fibers, to prevent the thermoplastic matrix from falling through the carrier material.

Preferably, the nonwoven layer of fibers and the scrim, and optional further material layers, are supplied as a single, integrated carrier material wherein the scrim and the nonwoven layer of fibers (and optional further material layers) are connected to each other to form an integrated carrier material. Connection of the scrim and the nonwoven layer of fibers to each other can be performed by any known suitable process, such as for example by use of an adhesive such as a glue and/or a hot melt, or by thermal bonding, such as hot air bonding or calendaring, and/or by mechanical bonding processes, such as stitching, mechanical needling and/or fluid entanglement, for example hydroentanglement. The term "connected to" is to be understood to include also the situation wherein the scrim is located in between (embedded) two nonwoven layers of fibers wherein the nonwoven layers of fibers are bonded to each other through the openings in the scrim by any suitable process, thus integrating the warp and weft yarns of the scrim into the carrier material by encapsulation by the fibers of the two nonwoven layers of fibers bonded to each other.

In an embodiment, the scrim comprised in the carrier material comprises high modulus warp yarns extending in machine direction, such as for example glass yarns or high modulus polyester yarns. Preferably, the scrim comprises glass yarns as warp yarns. Preferably all warp yarns in the scrim are high modulus yarns, more preferably all warp yarns in the scrim are glass yarns. The high modulus warp yarns preferably have a modulus of at least 25 GPa, preferably at least 40 GPa, more preferably at least 50 GPa, most preferably at least 75 GPa to reduce contraction in cross machine direction of the nonwoven layer of fibers.

Preferably, the modulus of the scrim in machine direction is at least 20 N/5 cm, which can be reached by selecting the type and amount of high modulus yarns comprised as warp yarns in the scrim. The modulus is determined as the load at specified elongation of 2% (LASE2%) in accordance with EN29073-3 (08-1992) with a clamp speed of 200 mm/min at a temperature of 20° C. Preferably, the modulus of the scrim in machine direction is at least 25 N/5 cm, more preferably at least 30 N/5 cm.

Preferably, the scrim has a breaking strength in machine direction of at least 50 N/5 cm, more preferably at least 60 N/5 cm.

The linear density of the warp yarns of the scrim may vary in a wide range as the warp yarns are generally not visible in the cushioned vinyl floor covering provided that the tension applied onto the carrier material during manufacturing of the cushioned vinyl floor covering is not too high. Preferably, the linear density of the warp yarns is 100 tex or less, more preferably 50 tex or less, more preferably 28 tex or less, even more preferably 20 tex or less, most preferably 15 tex or less, to prevent the warp yarns from being visible in the cushioned vinyl floor covering even when very high tensions are applied during manufacture and to have a more balanced construction of the scrim.

Preferably, the scrim comprises warp yarns in an amount of 20 to 400 warp yarns per meter width, more preferably in an amount of 25 to 300 per meter width, even more preferably in an amount of 50 to 200 per meter width, most preferably in an amount of 75 to 150 per meter width in order to prevent the formation of wrinkles in the cushioned vinyl floor covering. When the distance between neighbouring warp yarns increases, the risk of formation of wrinkles extending in machine direction increases. Preferably, the warp yarns are spaced at regular distances from each other.

The warp yarns may comprise glass yarns. The glass yarns may comprise any type of glass, E, C, S, R or AR (Alkali Resistant). In particular AR- or E-glass are preferred for their mechanical strength.

In an embodiment, the scrim comprises high modulus weft yarns, such as for example glass yarns or high modulus polyester yarns. All weft yarns in the scrim may be high modulus yarns. Preferably, the weft yarns are inorganic yarns, more preferably glass yarns. The high modulus weft yarns preferably have a modulus of at least 25 GPa, preferably at least 40 GPa, more preferably at least 50 GPa, most preferably at least 75 GPa.

Preferably, the modulus of the scrim in cross machine direction is at least 20 N/5 cm, which can be reached by selecting the type and amount of high modulus yarns comprised as warp yarns in the scrim. Preferably, the modulus of the scrim in cross machine direction is at least 25 N/5 cm, more preferably at least 30 N/5 cm.

Preferably, the scrim has a breaking strength in cross machine direction of at least 30 N/5 cm, more preferably at least 40 N/5 cm.

Preferably, the scrim comprises weft yarns in an amount of 10 to 400 weft yarns per meter length, more preferably in an amount of 15 to 300 per meter length, even more preferably in an amount of 20 to 200 per meter length, most preferably in an amount of 25 to 100 per meter length. Preferably, the weft yarns are spaced at regular distances from each other.

The weft yarns may comprise glass yarns. The glass yarns may comprise any type of glass, E, C, S, R or AR (Alkali Resistant). In particular AR- or E-glass are preferred for their mechanical strength.

The glass yarns may comprise a sizing to improve handling of the yarns. Alternatively or additionally, the glass yarns may also be coated with a polymer coating, such as SBR elastomer or an acrylic polymer.

The weft yarns of the scrim extending in cross machine direction, in particular glass weft yarns, may be single filaments, also known as monofilaments, having a linear density of 28 tex or less, preferably 20 tex or less, more preferably 15 tex or less. The monofilaments may have any cross sectional shape, including round, trilobal, multilobal or rectangular, the latter exhibiting a width and a height wherein the width may be considerably larger than the height, i.e. having a width to height ratio of at least 2, preferably at least 5, more preferably at least 10, most preferably at least 25, so that the monofilament in this embodiment is a tape. Preferably, the monofilaments have a round cross sectional shape.

Alternatively, the weft yarns of the scrim extending in cross machine direction may comprise multifilament yarns comprising a multitude of individual fine filaments, the total multifilament yarns having a linear density of 28 tex or less, preferably 20 tex or less, more preferably 15 tex or less. The individual fine filaments of the multifilament yarn may have any cross sectional shape, including round, trilobal, multilobal or rectangular, the latter exhibiting a width and a height wherein the width may be considerably larger than the height, i.e. having a width to height ratio of at least 2, preferably at least 5, more preferably at least 10, most preferably at least 25, so that the monofilament in this embodiment is a tape. The multifilament yarn may comprise individual fine filaments having different cross sectional shape. Preferably, the individual fine filaments of the multifilament yarn have a round cross sectional shape.

The multifilament yarns comprised in the weft yarns of the scrim may be twisted. The degree of twisting of the multifilament yarns may vary over a wide range. In an embodiment, the multifilament yarns comprise at least 10 twists per meter length, more preferably at least 30 twists per meter length, to facilitate handling of the multifilament yarns during manufacture of the scrim as the risk is reduced of an individual fine filament sticking out of the bundle of filaments which could disturb the scrim manufacturing process. Twists present in the multifilament yarn have the tendency to force the bundle of individual fine filaments into an approximately round overall cross section for the multifilament yarn.

However, the multifilament yarns may comprise a reduced level of twists to enable that the multifilament yarn assumes an essentially flat orientation in the scrim. As there are only a limited number of twists present in the multifilament yarn, the individual fine filaments have more freedom to spread out into a single layer of fine filaments arranged adjacent to one another, or into a limited number of layers of fine filaments arranged adjacent to one another, the layers arranged on top of each other. The multifilament yarns may comprise at most 70 twists per meter length, more preferably at most 50 twists per meter length.

Preferably, the multifilament yarns comprise at most 70 twists per meter length, more preferably at most 50 twists per meter length as a (too) high degree of twisting increases internal stresses in the twisted multifilament yarns without further improving handling during manufacture of the scrim.

Preferably, the individual fine glass filaments of the multifilament yarn have a diameter in the range of 3 µm to 18 µm, more preferably in the range of 4 µm to 13 µm, most preferably in the range of 5 µm to 7 µm.

The scrim may comprise a binder to improve handling of the scrim and/or to improve the dimensional stability and processability of the scrim. Preferably, the binder comprises any thermoplastic or thermoset organic polymers, copolymers or any mixture thereof, such as polyvinyl alcohol PVA, acrylate, styrene butadiene, ethylene, vinyl acetate, styrene acrylates, polyvinyl acrylate, or PVC plastisol.

Within the scope of the present invention it is understood that the term fibers refers to both staple fibers and filaments. Staple fibers are fibers which have a specified, relatively short length in the range of 2 to 200 mm. Filaments are fibers having a length of more than 200 mm, preferably more than 500 mm, more preferably more than 1000 mm. Filaments may even be virtually endless, for example when formed by continuous extrusion and spinning of a filament through a spinning hole in a spinneret.

The fibers of the nonwoven layer of fibers may have any cross sectional shape, including round, trilobal, multilobal or rectangular, the latter exhibiting a width and a height wherein the width may be considerably larger than the height, i.e. having a width to height ratio of at least 2, preferably at least 5, more preferably at least 10, most preferably at least 25, so that the fiber in this embodiment is a tape. Furthermore, said fibers may be mono-component, bicomponent or even multi-component fibers.

In an embodiment, the fibers in the nonwoven layer of fibers have a linear density in the range of 1 to 25 dtex, preferably in the range of 2 to 20 dtex, more preferably in the range of 5 to 15 dtex, most preferably in the range of 5 to 10 dtex to provide processing stability and mass regularity to the carrier material while maintaining sufficient structure openness for even penetration of the PVC plastisol through the carrier material. The unit dtex defines the fineness of the fibers as their weight in grams per 10000 meter.

The nonwoven layer of fibers comprised in the carrier material may be any type of nonwoven, such as for example staple fiber nonwovens produced by well-known processes, such as for example carding processes, wet-laid processes or air-laid processes or any combination thereof. The nonwoven layer of fibers may also be a nonwoven composed of filaments produced by well-known spunbonding processes wherein filaments are extruded from a spinneret and subsequently laid down on a conveyor belt as a web of filaments and subsequently bonding the web to form a nonwoven layer of fibers, or by a two-step process wherein filaments are spun and wound on bobbins, preferably in the form of multifilament yarns, followed by the step of unwinding the yarns and/or multifilament yarns from the bobbins, optionally opening the multifilament yarns into essentially individual filaments and/or filaments groups comprising 2 to 50 filaments, preferably 2 to 25 filaments, more preferably 2 to 10 filaments, and laying the filaments and/or filament groups down on a moving conveyor belt as a web of filaments and bonding the web to form a nonwoven layer of fibers.

Preferably, the fibers in the nonwoven layer of fibers are filaments in order to provide higher tensile strength and/or higher tear strength to the carrier material and/or to the cushioned vinyl floor covering.

Each of the one or more nonwoven layers of fibers is composed of thermoplastic fibers for at least 50 wt. % of the total weight of fibers in the respective nonwoven layer of fibers, preferably for at least 75 wt. %, more preferably for at least 90 wt. %, even more preferably for at least 95 wt. %, most preferably for 100 wt. %, as increasing the amount of thermoplastic fibers in the nonwoven layer of fibers increases the tensile strength, increases tear resistance and/or increases the flexibility of the carrier material and the (cushioned) vinyl floor covering.

In an embodiment each nonwoven layer of fibers is composed for 100 wt. % of thermoplastic fibers of the total weight of fibers in the nonwoven layer of fibers.

The thermoplastic polymer from which the thermoplastic fibers in the nonwoven layer of fibers are composed may be any type of thermoplastic polymer capable of withstanding the temperatures encountered in the cushioned vinyl floor covering manufacturing process. The thermoplastic fibers in the nonwoven layer of fibers may preferably comprise a polyester, such as for example polyethylene terephthalate (PET) (based either on DMT or PTA), polybutylene terephthalate (PBT), polytrimethylene terephthalate (PTT), polyethylene naphthalate (PEN) and/or polylactic acid (PLA), a polyamide, such as for example polyamide-6 (PA6), polyamide-6,6 (PA6,6) and/or polyamide-6,10 (PA6,10), polyphenylenesulfide (PPS), polyethyleneimide (PEI) and/or polyoxymethylene (POM) and/or any copolymer or any blend thereof.

The thermoplastic fibers may comprise up to 25 wt. %, based on the total weight of the fibers, of additives, such as for example spinning auxiliaries, fillers, flame retardant materials, UV inhibitors, crystallization retarders/accelerators, plasticizers, heat stabilizers, antimicrobial additives, coloring agents, such as for example carbon black, or any combination thereof.

Although the one or more nonwoven layer(s) of fibers of the carrier material may comprise glass fibers in a minor amount, each nonwoven layer of fibers of the carrier material is composed of thermoplastic fibers for at least 50 wt. % of the total weight of the respective nonwoven layer of fibers to provide improved tear resistance and flexibility to the cushioned vinyl floor covering as compared to glass nonwoven based carrier materials, which are known to have little flexibility and low tear strength. The term "minor amount" is understood to mean less than 50 wt. %, preferably less than 25 wt. %, more preferably less than 10 wt. %, even more preferably less than 5 wt. % of the total weight of the respective nonwoven layer of fibers.

Therefore, the carrier material explicitly does not comprise a nonwoven layer of fibers composed for 50 wt. % or more of glass fibers.

The glass fibers in the nonwoven layer of fibers may comprise any type of glass, such as E, C, S, R or AR (Alkali Resistant). In particular AR- or E-glass are preferred for their mechanical strength.

In an embodiment, the nonwoven layer of fibers may be composed of cellulosic fibers for at least 50 wt. % of the total weight of fibers in the nonwoven layer of fibers, preferably for at least 75 wt. %, more preferably for at least 90 wt. %, even preferably for at least 95 wt. %.

In an embodiment the nonwoven layer of fibers is composed for 100 wt. % of cellulosic fibers of the total weight of fibers in the nonwoven layer of fibers.

The total weight of the one or more nonwoven layer(s) of fibers comprised in the carrier material may be in the range of 10 g/m² to 250 g/m², preferably in the range of 25 g/m² to 150 g/m², more preferably in the range of 50 g/m² to 120 g/m², most preferably in the range of 60 g/m² to 100 g/m², to keep the structure of the carrier material open enough for penetration of the impregnation layer of PVC plastisol and to provide sufficient mechanical adhesion of the impregnation layer to the carrier material. Lower total weight of the nonwoven layer of fibers results in less consumption of PVC plastisol in the impregnation layer.

In an embodiment, the thermoplastic fibers in each one of the nonwoven layers of fibers individually, preferably composed of filaments, may be composed of a single type of mono-component fibers, which are bonded by any suitable bonding technique, such as for example by calendering the web of fibers between two calender rolls, by mechanical needling, by hydroentanglement, by ultrasonic bonding or by any combination thereof.

In another embodiment the thermoplastic fibers in the nonwoven layer of fibers, preferably composed of filaments, may comprise at least two different types of mono-component fibers, each type of mono-component fibers being composed of a polymer of different chemical construction and/or having a different melting point. The nonwoven layer of fibers may comprise two, three or more different types of mono-component fibers. Preferably, the nonwoven layer of fibers consists of two different types of mono-component fibers. It is preferred that the melting points of the two different polymers differ by at least 10° C. More preferably the melting points differ by at least 50° C. Such a nonwoven layer could be thermally bonded by subjecting the web of fibers to a temperature in the range of the melting point of the polymer with the lower melting point.

The melting point of a polymer is determined by Differential Scanning Calorimetry by heating the polymer at a rate of 10° C. per minute from 0° C. to a temperature where the polymer has completely melted, e.g. to a temperature of 300° C. The melting temperature of the polymer is defined by the temperature at the maximum of the endothermic melting peak.

In another embodiment, the thermoplastic fibers in the nonwoven layer of fibers, preferably composed of filaments, may comprise bicomponent fibers. Bicomponent fibers are fibers composed of two polymers of different chemical construction and/or having a different melting point. The nonwoven layer of fibers may comprise two, three or more different types of bicomponent fibers. Preferably, the nonwoven layer of fibers consists of one type bicomponent fibers or two different types of bicomponent fibers. A basic distinction is being drawn between three well-known types of bicomponent fibers: side-by-side types, core-sheath types and islands-in-the-sea types bicomponent fibers. In a preferred embodiment the melting points of the two polymers comprised in the bicomponent fibers differ by at least 10° C. More preferably the melting points differ by at least 50° C. Such a nonwoven layer comprising bicomponent fibers, when composed of side-by-side types and/or core-sheath type bicomponent fibers, could be thermally bonded by subjecting the web of fibers to a temperature in the range of the melting point of the polymer exhibiting the lower melting point. In a preferred embodiment, the nonwoven carrier is predominantly made from core-sheath type bicomponent fibers, preferably filaments. Predominantly is understood to mean that at least 50% of the fibers comprised in the nonwoven layer of fibers are core-sheath type bicomponent fibers, preferably at least 75%, more preferably at least 90%, even more preferably at least 95%, most preferably 100%.

Preferably, the core/sheath ratio in the core/sheath bicomponent fibers lies between 95/5 Vol. % and 5/95 Vol. %, more preferably between 90/10 Vol. % and 10/90 Vol. %, most preferably between 75/25 Vol. % and 25/75 Vol. %.

The thermoplastic fibers comprised in the first ("one") nonwoven layer of fibers may be different from the thermoplastic fibers comprised in at least one of the other ("more") nonwoven layers of fibers to optimize the performance of each nonwoven layer of fibers in the carrier material, for example for optimum adhesion to the matrix in case multiple layers of impregnation matrices are applied.

Preferably, the thermoplastic fibers comprised in the first nonwoven layer of fibers is the same as the thermoplastic fibers as comprised in each of the other nonwoven layers of fibers in the carrier material for a simplified manufacture of the carrier material.

In a preferred embodiment, the sheath of the core/sheath bicomponent fibers consists mainly of a polyamide, preferably polyamide-6 (PA6), and the core consists mainly of a polyester, preferably polyethylene terephthalate (PET).

Without being bound to theory, it is believed that buckling of weft yarns of prior art scrims during gelation of the PVC plastisol in the impregnation layer, due to shrinkage and/or contraction of the nonwoven layer of fibers in cross machine direction, results in an uneven surface of the gelated impregnation layer, especially when buckling of the weft yarns occurs out of the plane which forms a surface of the carrier material, as is schematically depicted in FIG. 1. A scrim comprises warp yarns (2) extending in machine direction and weft yarns (1) extending in cross machine direction. The weft yarn (1) has buckled during gelation of the impregnation layer of PVC plastisol. The impregnation layer has an irregular upper surface (3) and an irregular lower surface (4) due to buckling of the weft yarn (1). Due to the uneven upper surface (3) of the gelated impregnation layer locally varying amounts, i.e. differences in layer thickness (D1, D2), of PVC plastisol comprising a blowing agent will be applied as foaming layer coated on the irregular surface (3) of the gelated impregnation layer. The coating layer may still have a smooth, flat upper surface (5) directly after coating and after gelation of the PVC plastisol in the foaming layer. A desired ink pattern and a wear layer (6) may be applied on the surface (5) of the coated foaming layer. However, the locally varying amounts (D1, D2) of PVC plastisol comprising a blowing agent will induce surface irregularities in the surface (8) of the final cushioned vinyl floor covering after curing (foaming) of the foaming layer. At locations where a larger amount (D1) of PVC plastisol comprising a blowing agent is applied the final thickness of the cushioned vinyl floor covering after foaming of the foaming layer will be higher than at locations where a smaller amount (D2) of PVC plastisol comprising a blowing agent is applied resulting in surface irregularities in the surface (8) of the final cushioned vinyl floor covering.

Furthermore, it is believed that the uneven surfaces (3, 4) of the gelated impregnation layer, due to buckling of the weft yarns (1) of the scrim upon shrinkage or contraction in cross machine direction of the nonwoven layer of fibers, complicates the local application of desired ink patterns on the gelated foaming layer (5). Although coating and subsequent gelation of the foaming layer may form an even surface (5) for the ink, it will be difficult to ensure application of an even pressure between the printing unit and the surface (5) of the gelated foaming layer over the surface to be printed, especially when the actual pressure is determined by the support provided by a supporting roller which is in direct contact with the opposite surface (4) of the irregular gelated impregnated layer. Finally, a backing layer (7) of foamable PVC plastisol is coated on the opposite surface (4) of the irregular gelated impregnated layer. Due to the uneven lower surface (4) of the gelated impregnation layer locally varying amounts, i.e. differences in layer thickness of PVC plastisol comprising a blowing agent will also be applied as backing layer coated on the irregular surface (4) of the gelated impregnation layer. As the backing layer may be subjected to an embossing step, and the back side of the cushioned vinyl floor covering is not visible when installed on the floor, this effect may be of less importance.

Although yarns having a lower linear density are expected to be less stiff as compared to yarns having a higher linear density, and are thus expected to be less resistant to compressive stresses and thus more prone to buckling, it was surprisingly found that a carrier material comprising a scrim comprising weft yarns having a linear density of 28 tex or less, actually prevents, or at least significantly reduces, the formation of printing errors and/or surface irregularities in the cushioned vinyl floor covering.

The carrier material can advantageously be used in roofing, flooring or carpeting composite products, in particular in (cushion) vinyl floor coverings.

EXAMPLES

Example 1

A cushioned vinyl floor covering was produced based on a carrier comprising a nonwoven layer of fibers and a scrim. The carrier material was composed of a scrim embedded between two nonwoven layers of fibers. The two nonwoven layers of fibers were thermally bonded to each other through the openings in the scrim by though air bonding, thus integrating the warp and weft yarns of the scrim into the carrier material by encapsulation by the fibers of the two nonwoven layers of fibers bonded to each other.

The two nonwoven layers of fibers were composed of core-sheath bicomponent filaments having a linear density of 7 dtex, the core of the filaments being composed of polyethylene terephthalate and the sheath being composed of polyamide-6 in a ratio of 74/26 vol. %/vol. % and the two nonwoven layer of fibers had a combined weight 100 g/m$^2$. The scrim was composed of 1.3 glass yarns per cm width extending in machine direction and 0.8 glass yarns per cm extending in cross machine direction. The glass yarns extending in machine direction and the glass yarn extending in cross machine direction both had a linear density of 11 tex.

The cushioned vinyl exhibited no wrinkles extending in machine direction and printing errors in the cushioned vinyl were not observed.

COMPARATIVE EXAMPLES

Six types of cushioned vinyl floor covering were produced based on carrier materials comprising a nonwoven layer of fibers and a scrim. The carrier material in each comparable example was composed of a scrim embedded between two nonwoven layers of fibers. The two nonwoven layers of fibers were thermally bonded to each other through the openings in the scrim by though air bonding, thus integrating the warp and weft yarns of the scrim into the carrier material by encapsulation by the fibers of the two nonwoven layers of fibers bonded to each other.

The two nonwoven layers of fibers were composed of core-sheath bicomponent filaments either having a linear density of 7 dtex or a linear density of 10 dtex, the core of the filaments being composed of polyethylene terephthalate and the sheath being composed of polyamide-6 in a ratio of 74/26 vol. %/vol. % and the two nonwoven layer of fibers had a combined weight 75 g/m$^2$. The scrim was composed of either 1.3 glass yarns per cm width extending in machine direction and 0.8 glass yarns per cm extending in cross machine direction, or of 0.65 glass yarns per cm width extending in machine direction and 0.8 glass yarns per cm extending in cross machine direction, or of 0.65 glass yarns per cm width extending in machine direction and 0.4 glass yarns per cm extending in cross machine direction. The glass yarns extending in machine direction and the glass yarn extending in cross machine direction both had a linear density of 34 tex in all three scrims.

Although all six types of cushioned vinyl exhibited no wrinkles extending in machine direction, printing errors were observed in close proximity of those locations where the glass yarns extending in cross machine direction were positioned.

The invention claimed is:

1. A carrier material for manufacturing a composite product comprising the carrier material and an impregnated matrix, the carrier material comprising
    nonwoven layers of fibers, wherein each nonwoven layer of fibers is composed of thermoplastic fibers for at least 50 wt. % of the total weight of fibers in the respective nonwoven layer of fibers, and
    a scrim comprising weft yarns consisting of glass fibers or consisting of high modulus polyester fibers, the weft yarns of glass fibers having a linear density of 28 tex or less, the weft yarns of high modulus polyester fibers having a linear density of 50 tex or less, and the weft yarns having a modulus of at least 25 GPa,
    wherein the scrim is embedded between two of the nonwoven layers of fibers, the scrim being located in between the two nonwoven layers of fibers, and the two nonwoven layers of fibers being directly bonded to each other only through openings in the scrim, integrating the warp and the weft yarns of the scrim into the carrier material by encapsulation by the fibers from the two nonwoven layers of fibers that are bonded to each other, and
    wherein the scrim and the nonwoven layers of fibers are connected to each other by bonding that consists of only thermal bonding achieved through use of hot air to form an integrated carrier material.

2. The carrier material according to claim 1 wherein the scrim comprises warp yarns of glass fibers or high modulus polyester fibers, wherein the warp yarns have a modulus of at least 25 GPa, the warp yarns having a linear density of 100 tex or less.

3. The carrier material according to claim 1 wherein the scrim further comprises warp yarns having a modulus of at least 25 GPa.

4. The carrier material according to claim 1 wherein the weft yarns of the scrim are multifilament glass yarns and wherein the individual glass filaments of the multifilament glass yarns have a diameter in the range of 3 μm to 18 μm.

5. The carrier material according to claim 1 wherein the weft yarns and/or warp yarns of the scrim are made from E-glass or AR-glass.

6. The carrier material according to claim 1 wherein at least one of the nonwoven layers of fibers is composed of thermoplastic fibers for at least 75 wt. % of the total weight of fibers in the respective nonwoven layer of fibers.

7. The carrier material according to claim 1 wherein the nonwoven layers of fibers comprise mono-component fibers or comprises bicomponent fibers.

8. The carrier material according to claim 6 wherein the nonwoven layers of fibers are thermally bonded.

9. A composite product comprising the carrier material according to claim 1 and an impregnated matrix.

10. The composite product according to claim 9, wherein the composite product is a vinyl floor covering.

11. The carrier material according to claim 1 wherein the carrier material has an openness such that a matrix material forming the impregnated matrix is able to evenly penetrate through the carrier material.

* * * * *